US006105259A

United States Patent [19]

Meyers et al.

[11] Patent Number: 6,105,259

[45] Date of Patent: Aug. 22, 2000

[54] EATING UTENSILS

[75] Inventors: Brenda J. Meyers, Reedsburg; Mark A. Gilbertson, Sauk City; John W. Grosz, Waupun; Edward A. Raleigh, Waunakee, all of Wis.; Thomas G. Skulley, St. Paul, Minn.; Deborah L. Harrington, Ellsworth, Wis.

[73] Assignee: Gerber Products Company, Fremont, Mich.

[21] Appl. No.: 09/176,635

[22] Filed: Oct. 22, 1998

[51] Int. Cl.[7] .......... A47J 43/28

[52] U.S. Cl. .......... 30/323; 150/326

[58] Field of Search .......... 30/147, 148, 150, 30/322, 324, 342, 323, 326; D7/653, 664

[56] References Cited

U.S. PATENT DOCUMENTS

| | | | |
|---|---|---|---|
| D. 14,946 | 4/1884 | Hart . | |
| D. 28,444 | 4/1898 | Richardson . | |
| 99,341 | 2/1870 | Patterson | 30/322 |
| D. 183,451 | 9/1958 | Fiske | D7/653 |
| D. 204,693 | 5/1966 | Toffolon . | |
| D. 272,033 | 1/1984 | Saucier | D7/653 |
| D. 330,481 | 10/1992 | Green | D7/653 |
| D. 342,648 | 12/1993 | Cauereels et al. | D7/653 |
| D. 368,832 | 4/1996 | Held | D7/653 |
| D. 392,161 | 3/1998 | Falkenstein, Jr. | D7/653 |
| 684,761 | 10/1901 | Smith | 30/322 |
| 1,059,673 | 4/1913 | Lamb | 30/342 |
| 1,751,853 | 3/1930 | Buck | 30/322 |
| 2,322,503 | 6/1943 | Bowman | 30/148 |
| 2,751,683 | 6/1956 | Johns | 30/324 |
| 2,762,120 | 9/1956 | Mack | 30/322 |
| 3,138,871 | 6/1964 | Sears | 30/150 |
| 4,317,284 | 3/1982 | Prindle | 30/340 |
| 5,062,211 | 11/1991 | Di Amico | 30/322 |
| 5,419,049 | 5/1995 | MacArthur-Onslow | 30/322 |
| 5,727,328 | 3/1998 | Kim | 30/526 |
| 5,890,223 | 4/1999 | Klemmer | 30/150 |

FOREIGN PATENT DOCUMENTS

| | | | |
|---|---|---|---|
| 623430 | 2/1963 | Belgium | 30/322 |
| 695300 | 7/1940 | Germany . | |
| W9610939 | 4/1996 | WIPO . | |

*Primary Examiner*—Hwei-Siu Payer
*Attorney, Agent, or Firm*—Price, Heneveld, Cooper, Dewitt & Litton

[57] ABSTRACT

An eating utensil includes a body defining a handle portion shaped to facilitate grasping by a user. A pair of spaced-apart outer tines extend from the body. Each of the spaced-apart outer tines defines an outer tine length. The eating utensil further includes one shorter, intermediate tine disposed between the outer tines in plan view. The shorter, intermediate tine extends from the body to define an intermediate tine length that is less than the outer tine lengths.

12 Claims, 3 Drawing Sheets

EATING UTENSILS

BACKGROUND OF THE INVENTION

The present invention relates to eating utensils, and in particular to an eating utensil configured for use by small children and the like.

Various types of eating utensils, such as forks, spoons, and knives, are well known. Eating utensils such as spoons and forks commonly include a handle for grasping by a user, and another portion that retains the food during transport from a plate or the like to the user's mouth. However, when standard utensil designs are used by individuals having diminished capacity, such as small children or individuals having disabilities, the utensil may be difficult to grasp and retain. Furthermore, when used by an individual having diminished capacity, the utensil could be inserted an undesirable distance into the user's mouth, causing discomfort or injury. Accordingly, there exists a need for an eating utensil solving the above-identified problems.

SUMMARY OF THE INVENTION

One aspect of the present invention is an eating utensil including a body defining a handle portion shaped to facilitate grasping by a user. A pair of spaced-apart outer tines extend from the body. Each of the spaced-apart outer tines defines an outer tine length. The eating utensil further includes one shorter, intermediate tine disposed between the outer tines in plan view. The shorter, intermediate tine extends from the body to define an intermediate tine length that is less than the outer tine lengths.

Another aspect of the present invention is an eating utensil including a body defining a base portion and a handle portion shaped to permit grasping by a user. The eating utensil includes a pair of spaced-apart outer tines extending from the base portion of the body, and at least one intermediate tine extending from the base portion of the body and disposed between the outer tines. The body further includes a bulbous portion adjacent the base portion of the body to discourage excessive insertion of the eating utensil in a user's mouth. The handle portion extends from adjacent the bulbous portion away from the outer and intermediate tines.

Yet another aspect of the present invention is an eating utensil including a body defining a handle portion shaped to permit grasping by a user. The eating utensil also includes a food-retaining portion extending from the body, the food-retaining portion shaped to supportably retain food thereon. The body includes a bulbous portion adjacent the food-retaining portion. The bulbous portion has a sufficient cross-sectional area to prevent excessive insertion of the eating utensil within the mouth of a user.

These and other features, advantages and objects of the present invention will be further understood and appreciated by those skilled in the art by reference to the following specification, claims and appended drawings.

DETAILED DESCRIPTION OF PREFERRED EMBODIMENT

Figure 1:
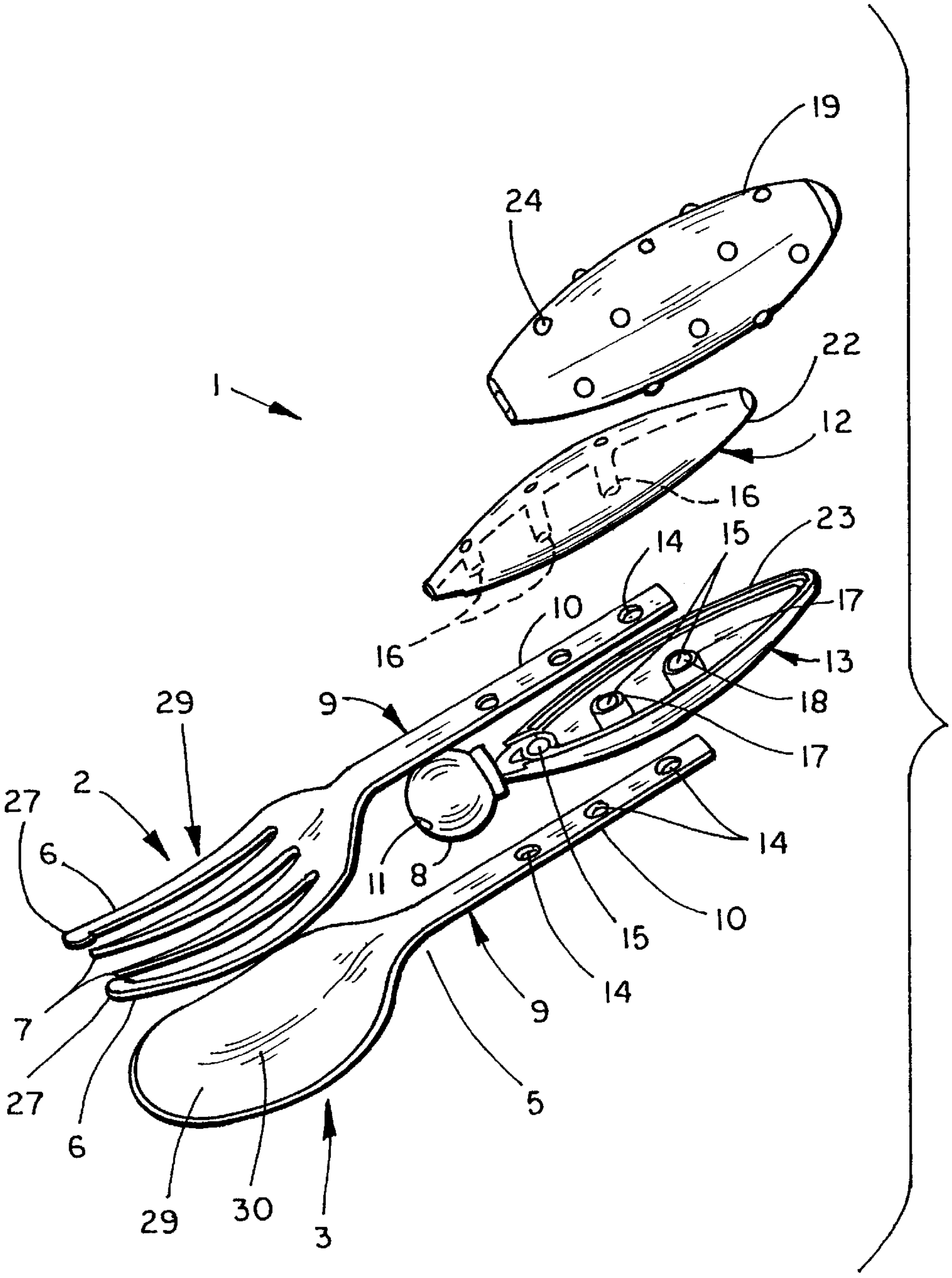
FIG. 1 is an exploded, fragmentary view of the eating utensil of the present invention, showing the fork and spoon embodiments.

For purposes of description herein, the terms "upper, " "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
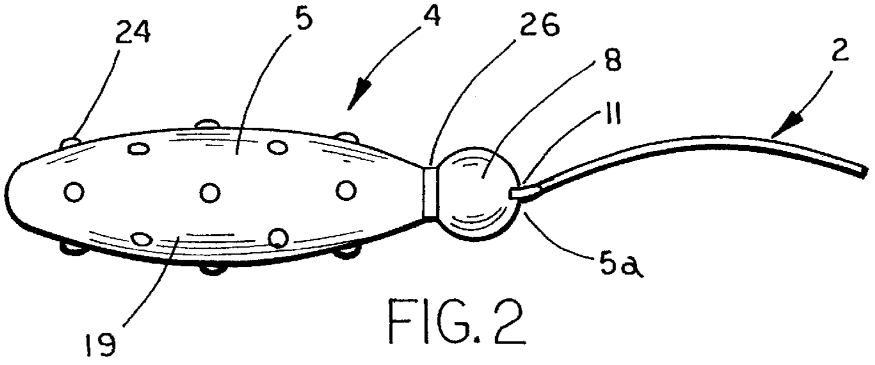
FIG. 2 is a side elevational view of the fork of FIG. 1.
Figure 3:
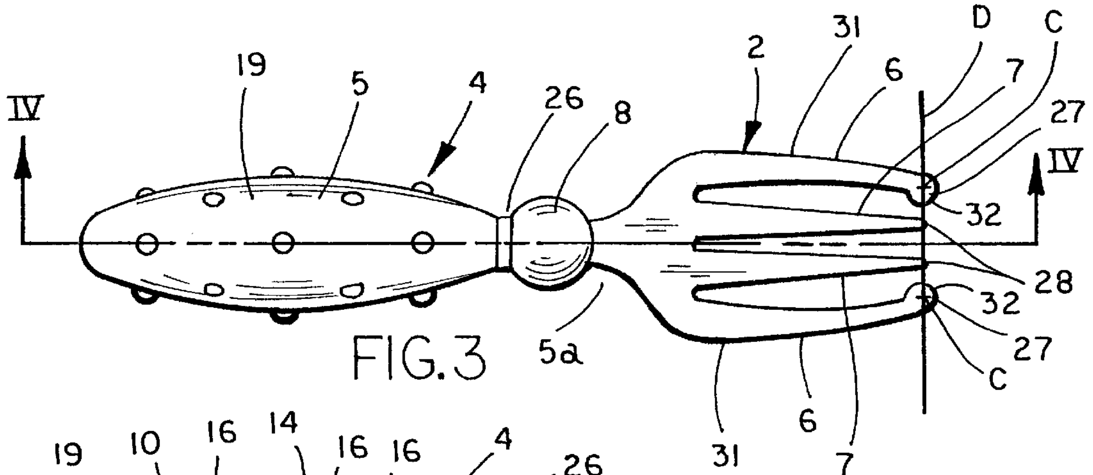
FIG. 3 is a top plan view of the fork of FIG. 1.
Figure 4:
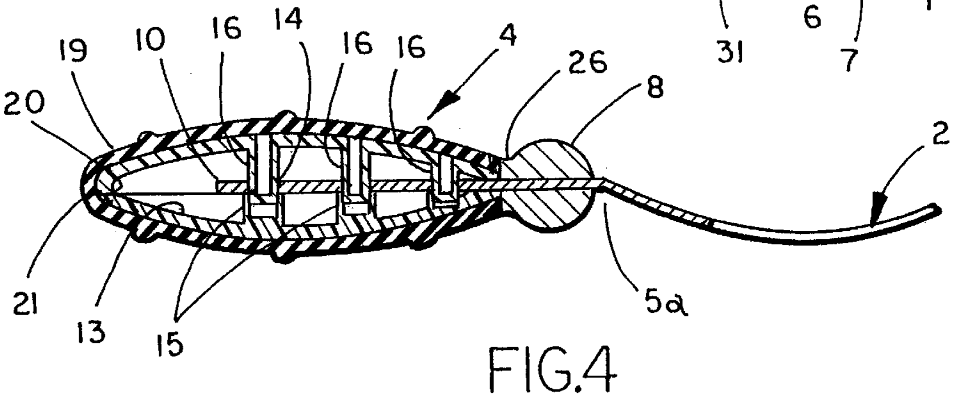
FIG. 4 is a cross-sectional view of the fork of FIG. 3 taken along the line IV—IV.

The reference numeral 1 (FIG. 1) generally designates an eating utensil embodying the present invention, which is particularly designed for use by small children or other individuals having limited capacity. When assembled, the eating utensil 1 may comprise a fork 2, or a spoon 3. With further reference to FIGS. 2–4, eating utensil 1 includes a body 4 defining a handle portion 5 shaped to permit grasping by a user, and a base portion *5a*. A pair of spaced-apart outer tines 6 extend from the base portion *5a* of body 4. At least one intermediate tine 7 also extends from the base portion *5a* of body 4, and is disposed between the outer tines 6 in plan view (FIG. 3). The body further includes an enlarged bulbous portion such as spherical ball portion 8 adjacent the base portion *5a* to discourage excessive insertion of the eating utensil 1 into a user's mouth. The handle portion 5 extends from adjacent the bulbous portion 8 away from the outer and intermediate tines 6 and 7.

As best seen in FIG. 1, fork 2 includes a stainless steel inner member 9 including an elongated inner handle portion 10, with tines 6 and 7 formed integrally therewith. Inner handle 10 has a rectangular cross-sectional shape that closely matches the opening 11 in sphere 8. When assembled (see also FIG. 4), inner handle 10 extends through opening 11, and abuts the upper ends 17 of upwardly-extending tubular locators 15 of lower handle cover 13. Downwardly-extending tubular locators 16 of upper handle cover 12 extend downwardly through clearance holes 14 in inner handle 10, and are tightly received within openings 18 of locators 15 to interconnect upper and lower handle covers 12 and 13. Upper handle cover 12 has a downwardly-extending lip 20 extending around the lower edge 22, and lower handle cover 13 includes an upwardly-extending lip 21 around the upper edge 23 that engages with lip 20 to further ensure a secure connection between upper and lower handle covers 12 and 13. Handle covers 12 and 13 are made of a suitable polymer material, such as polypropylene.

Figure 5:
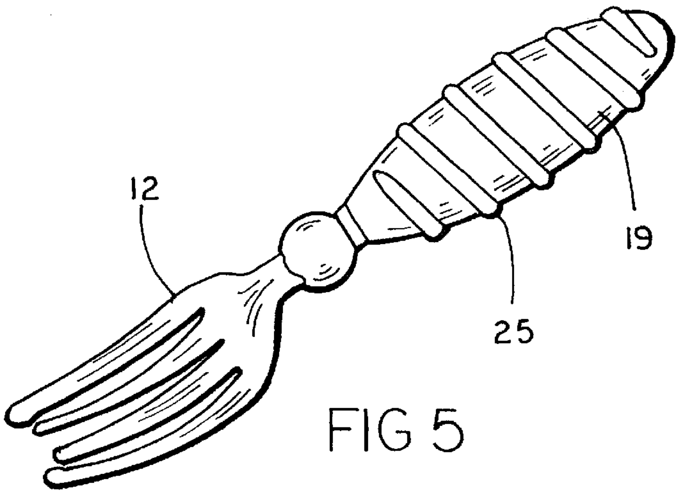
FIG. 5 is a perspective view of a fork having a second embodiment of the handle.

An elastomeric outer cover 19 fits over the upper and lower handle covers 12 and 13, and includes a plurality of protuberances, such as hemispherical members 24. An alternative embodiment of the cover 19 (FIG. 5) has a protuberance forming a spiral ridge 25 extending around the outer cover to aid grasping. Outer cover 19 is preferably made of a polymer, such as polyvinyl chloride, or an elastomeric polymer, such as SANTOPRENE, available from Advanced Elastomer Systems, Akron, Ohio, U.S.A., or KRATON (styrene-butadiene elastomer), available from Shell Oil Company, Houston, Tex., U.S.A. During manufacture, outer cover 19 is over-molded around upper and lower handle covers 12 and 13, thereby ensuring that upper and lower handle covers 12 and 13 do not separate from one another. Outer cover 19 forms a smoothly-tapering, enlarged diameter handle to facilitate grasping by a user. A reduced diameter neck 26 is formed at the junction of the handle portion 5 and spherical portion 8.

As best seen in FIG. 3, each outer tine 6 is relatively flat with an approximately constant thickness and an enlarged, radiused end 27 having a generally circular plan shape that reduces the possibility that a tine will contact a user's mouth in a manner causing injury. Ends 27 define an outer edge 32, at least a portion of which may be circular. However, other rounded, blunt, or arcuate shapes having a smooth contour to prevent injury with a width greater than the width "W" of outer tines 6 could also be utilized if desired for a particular application. Intermediate tines 7 are shorter than outer tines 6, such that the ends 28 of intermediate tines 7 are disposed inwardly from radiused ends 27 of outer tines 6. Ends 28 of intermediate tines 7 are disposed inwardly to at least about a line "D" that extends through the centers "C" of radiused ends 27 of outer tines 6. Outer edges 31 of outer tines 6 are generally tangential with outer edge 32 of radiused ends 27, thereby providing a smoothly curved transition between outer edges 31 and 32. The smooth transition between outer edges 31 and 32 offsets radiused ends 27 towards intermediate tines 7. The shorter length of the intermediate tines 7 further reduces the potential for uncomfortable or injurious contact with a user's mouth.

The spoon 3 is substantially similar to the fork 2 described above, except that the food-retaining portion 29 comprises a relatively thin portion having a concave upper surface 30 that is substantially similar to that of a conventional spoon. The upper and lower handle covers 12 and 13, as well as the outer cover 19 of the spoon 3 are retained on the elongate inner handle 10 in substantially the same manner as described above with respect to the fork 2.

Figure 6:
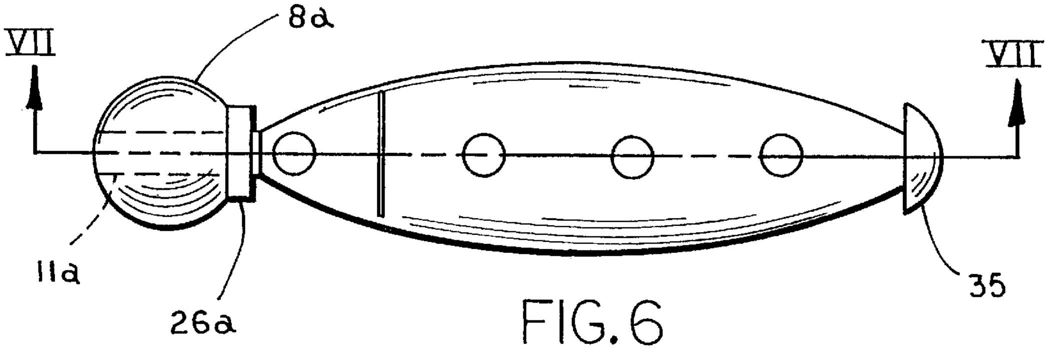
FIG. 6 is a top plan view of a second embodiment of the upper and lower handle covers.
Figure 7:
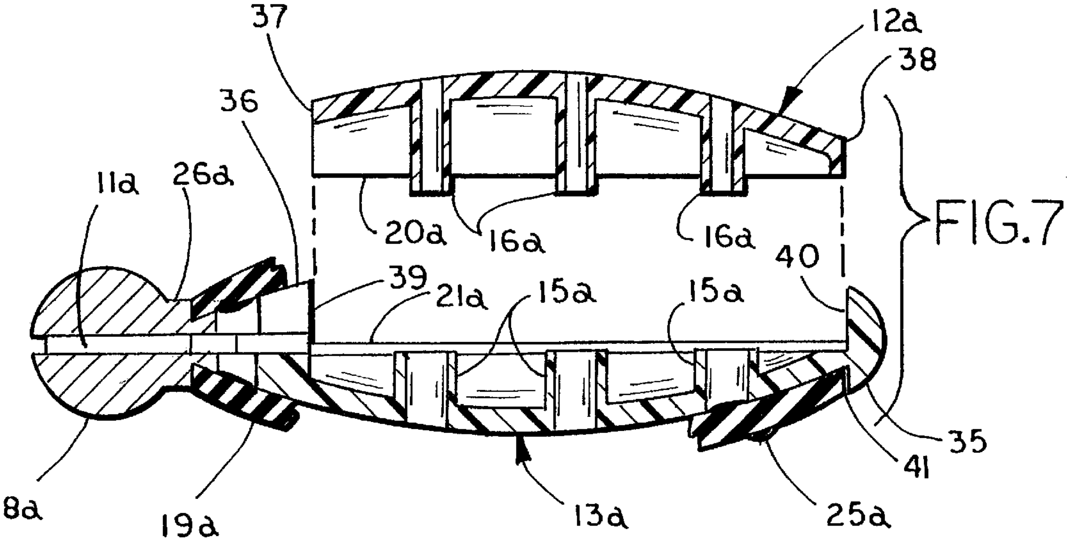
FIG. 7 is a fragmentary, exploded, cross-sectional view of the upper and lower handle covers of FIG. 6 taken along the line VII—VII.

Second embodiments of the upper handle cover 12*a* and lower handle cover 13*a* are illustrated in FIGS. 6 and 7. Reference numerals 16*a*, 20*a*, 21*a*, and 26*a* designate features of the second embodiment that are substantially the same as the corresponding features described above with respect to the first embodiment and designated with like numerals without the letter "a", such that these features will not be further described herein. Upper and lower handle covers 12*a* and 13*a* are substantially similar to the first embodiments of the handle covers 12 and 13 described above, except that lower handle cover 13*a* includes a cap portion 35 at one end, and a shoulder 36. Upper handle cover 12*a* is truncated at the ends 37 and 38 to fit snugly against the inner surfaces 39 and 40 of lower handle cover 13*a*. A second embodiment of the outer cover 19*a* is truncated at an end 41 to facilitate fabrication, and cap 35 has an outer surface contour blending smoothly with the end 41 of outer cover 19*a*. Outer cover 19*a* is substantially similar to the cover 19 described above, and includes a spiral ridge 25 that is substantially similar to the arrangement illustrated in FIG. 5. The upper and lower handle covers 12*a* and 13*a* are made of the same material as handle covers 12 and 13, and interconnect in substantially the same manner as upper and lower handle covers 12 and 13. A fork 2 or spoon 3 may be used with the handles 12*a* and 13*a* in substantially the same manner as described above with respect to the handle covers 12 and 13. The elongated inner handle 10 of the fork 2 or spoon 3 extends through the opening 11*a* in the spherical portion 8*a*, and abuts the upper edge of the extensions 15*a*.

The spherical ball portion 8 of the eating utensil 1 has sufficient diameter to prevent excessive insertion of the eating utensil in a user's mouth. The handle has an outer surface that tapers outwardly near the center portion, thereby providing a larger-diameter handle to facilitate grasping by a user having diminished gripping capability. The soft cover material of the handle further facilitates grasping, and the protuberances provide additional grip. The radiused ends of the outer tines prevent jabbing or other injury, and the shorter length intermediate tines do not extend past the outer tines, further ensuring that a user is not injured during use.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

What is claimed is:

1. An eating utensil, comprising:

a body defining a base portion and a handle portion shaped to permit grasping by a user;

a pair of spaced-apart outer tines extending from said base portion of said body;

at least one intermediate tine extending from said base portion of said body and disposed between said outer tines;

said body further including a bulbous portion adjacent said base portion of said body to discourage excessive insertion of said eating utensil in a user's mouth, said handle portion extending from adjacent said bulbous portion away from said outer and intermediate tines;

said bulbous portion defining an outer surface, at least a portion of which is spherical;

said handle portion being elongated, and including a central portion having an increased cross section to facilitate grasping by a users; and said outer tines having a central portion defining an intermediate width, said outer tines including free ends defining a width greater than said intermediate width, said free ends having an approximately constant thickness with a curved outer edge.

2. An eating utensil as set forth in claim 1, wherein:

said intermediate tine is shorter than said outer tines.

3. An eating as set forth in claim 2, wherein:

said body includes an elongated inner member defining a cross-sectional shape, said outer and intermediate tines forming an integral part of said elongated inner member; and said body including an outer portion forming said bulbous portion, said bulbous portion having an opening therethrough, said opening having a shape closely corresponding to said cross-sectional shape of said inner member, said inner member disposed within said opening.

4. An eating utensil as set forth in claim 3, wherein:

said outer portion of said body has a generally circular cross-sectional shape with a generally elliptical side elevational shape.

5. An eating utensil as set forth in claim 4, wherein:

said outer portion of said body includes at least one protuberance that facilitates grasping by a user.

6. An eating utensil as set forth in claim 5, wherein:

said protuberance comprises a spiral ridge extending around said outer portion of said body.

7. An eating utensil as set forth in claim 5, wherein:

said protuberance comprises a plurality of hemispherical bumps.

8. An eating utensil, comprising:

a body defining a handle portion shaped to facilitate grasping by a user;

a pair of spaced-apart outer tines extending from said body, each defining an outer tine length;

at least one shorter intermediate tine disposed between said outer tines in plan view, and extending from said body to define an intermediate tine length; and wherein:

said intermediate tine length is less than said outer tine lengths; and said outer tines are of equal length and have an enlarged end portion defining a free end.

9. An eating utensil as set forth in claim 3, wherein:

said handle portion is elongated, and said includes a spherical portion directly adjacent said handle portion.

10. An eating utensil as set forth in claim 9, wherein:

said body includes an inner member forming said outer and intermediate tines, said inner member having an elongated inner handle portion;

said body further including first and second discrete outer members secured to said inner member around said elongated inner handle portion of said inner member and defining said elongated handle portion when assembled therewith, said first outer member including said spherical portion of said body.

11. An eating utensil as set forth in claim 10, wherein:

said elongated inner handle portion defines a cross-sectional shape; and said spherical portion has an opening therethrough having a contour corresponding to said cross-sectional shape, said opening closely receiving said elongated inner handle portion therethrough.

12. An eating utensil, comprising:

a body defining a handle portion shaped to facilitate grasping by a user;

a pair of spaced-apart outer tines extending from said body, each defining an outer tine length;

at least one shorter intermediate tine disposed between said outer tines in plan view, and extending from said body to define an intermediate tine length that is less than said outer tine lengths; and said outer tines have an enlarged end portion defining a free end.

* * * * *

UNITED STATES PATENT AND TRADEMARK OFFICE

CERTIFICATE OF CORRECTION

PATENT NO. : 6,105,259

DATED : August 22, 2000

INVENTOR(S) : Brenda J. Meyers et al.

It is certified that error appears in the above-indentified patent and that said Letters Patent is hereby corrected as shown below:

Column 4, claim 1, line 42;
"users" should be --user--.
Column 4, claim 3, line 50;
After "eating" insert --utensil--.
Column 5, claim 9, line 20;
"claim 3" should be --claim 8--.
Column 5, claim 9, line 21;
Before "includes" insert --body--.

Signed and Sealed this

Twenty-fourth Day of April, 2001

Attest:

Nicholas P. Godici

NICHOLAS P. GODICI

*Attesting Officer*

*Acting Director of the United States Patent and Trademark Office*